United States Patent [19]
Clarke et al.

[11] Patent Number: 5,861,090
[45] Date of Patent: Jan. 19, 1999

[54] IN SITU ELECTROCHEMICAL REMEDIATION OF ORGANICALLY CONTAMINATED SOIL, SEDIMENTS AND GROUND WATER USING ELECTROCHEMICALLY GENERATED AND DELIVERED FENTON'S REAGENT

[75] Inventors: Robert L. Clarke, Orinda; Stuart L. Smedley, Menlo Park; Stan Kimmel, Monarch Beach, all of Calif.

[73] Assignee: Electrochemical Design Associates, Inc., Berkeley, Calif.

[21] Appl. No.: 790,507

[22] Filed: Jan. 29, 1997

Related U.S. Application Data

[60] Provisional application No. 60/010,821 Jan. 30, 1996.
[51] Int. Cl.⁶ .............................. C02F 1/46; C25C 1/22
[52] U.S. Cl. .................. 205/688; 205/766; 204/515; 588/204
[58] Field of Search .................... 205/766, 688; 204/515; 588/204

[56] References Cited

U.S. PATENT DOCUMENTS

| | | | |
|---|---|---|---|
| 5,137,608 | 8/1992 | Acar et al. | 205/766 |
| 5,398,756 | 3/1995 | Brodsky et al. | 204/515 |
| 5,476,992 | 12/1995 | Ho et al. | 204/515 |
| 5,538,636 | 7/1996 | Gnann et al. | 205/746 |

*Primary Examiner*—Arun S. Phasge
*Attorney, Agent, or Firm*—Limbach & Limbach L.L.P.

[57] ABSTRACT

Disclosed are methods for electrochemically remediating soil, clay or other media contaminated with organic pollutants using Fenton's Reagent. In the methods, anodes and cathodes are provided in wells formed in the contaminated medium. Anolyte and catholyte solutions are circulated to deliver iron ions to anodes and to deliver peroxide ions to cathodes in the medium. A potential difference is applied across the medium to cause the peroxide ions and iron ions to migrate toward each other and through the medium. The organic contaminants are destroyed in the medium in reactions with the peroxide ions and iron ions. The physicochemical condition of the electrolyte(s) is monitored and adjusted as necessary to control pH and to permit recycling of the electrolyte to the electrodes. Alternatively, peroxide ion can be generated in situ using an air depolarized cathode.

6 Claims, 2 Drawing Sheets

IN SITU ELECTROCHEMICAL REMEDIATION OF ORGANICALLY CONTAMINATED SOIL, SEDIMENTS AND GROUND WATER USING ELECTROCHEMICALLY GENERATED AND DELIVERED FENTON'S REAGENT

CROSS REFERENCE TO RELATED APPLICATIONS

This application claims the benefit of U.S. Provisional Application Ser. No. 60/010821, filed Jan. 30, 1996.

1. Field of the Invention

The present invention relates to an electrochemical method and apparatus for remediation of contaminated soil, sediments and groundwater. More particularly, the present invention relates to methods for electrochemically deploying Fenton's reagent to treat organically contaminated media and apparatuses for carrying out these methods.

2. Description of the Related Art

Many sites in the U.S. such as military bases, munitions stores, chemical processing plants, refineries, timber treating plants, and wharves have large soil areas contaminated with toxic organic chemicals. The contaminants found in these areas often threaten surrounding water resources due to hydraulic movement of water carrying along these toxic agents into aquifers The clean-up bill for contaminated sites in the U.S. is estimated at $1.7 trillion using conventional technology such as soil washing, incineration, vacuum extraction, biodigestion and dig and dump.

Organic solvents are the main contaminant class, but other organic environmental contaminants include chlorinated solvents, petroleum distillates, fuel oils, wood treatment chemicals, munitions, pesticides, and chemical intermediates from plastics, dyes and pharmaceutical manufacture. Organic compounds as a group have many different characteristics that impact the efficacy of removal by various methods; toxicity, volatility, solubility, reactivity, molecular size are some to consider. Also, some organic compounds are so stable to environmental effects that they persist in soil for many years and thus are of continuing concern as they are so toxic. Minute quantities of dioxin, some polychlorinated biphenyls (PCBs), some pesticides, polymers and compounds such as unexploded munitions are a threat to groundwater and sub-surface aquifers. Other stable contaminants, such as heavy tars and mineral oils leaking from underground storage tanks are candidates for electrochemical treatment.

In addition, to successfully remove organic contaminants, proper consideration should be given to soil type and geology. Thus, it appears no universally applicable method of removing organic compounds as a class exists, only a variety of techniques, including some electrochemical treatments that are useful for removing certain specific types of contaminants.

To further complicate matters, many sites contain both organic and inorganic toxic contaminants. For example, both solvent- and chromium-contaminated soil are commonly found under metal finishing plants and chemical manufacturing plants. The Dept. of Energy has large sites where solvent-, heavy metal- and radionuclide-contaminated soil. Soils contaminated with multiple types of contaminants such as these cannot be addressed by conventional in situ treatments. Bioremediation will not remove heavy metals, and "pump and treat" and "dig and dump" techniques only remove the problem to another area. Incineration and immobilization may be appropriate for one type of waste but are generally inappropriate for mixed wastes. Incineration or immobilization are not satisfactory methods of treating organic materials such as polychlorinated solvents, pesticides and nitro-based explosives in soil.

Other available techniques include electroosmosis such as the Lasagna process and those described in U.S. Pat. Nos. 5,074,986 and 5,137,608. However, electroosmosis is not widely applicable since it works only in soils with low ion exchange capacity and low ionic strength in the water in the soil. The types of organic contaminants treatable by this technique are also limited to those with some solubility in water. PCBs, TNT, and polycyclic aromatic compounds in general do not meet these criteria.

Electrokinetic remediation can remove metals and toxic anions such as arsenates and cyanide effectively both as an in situ and batch or lagoon system, however some means must be provided to permit introduction of reactants, to control PH around and avoid salt precipitation on the anodes and cathodes.

SUMMARY OF THE INVENTION

It is therefore advantageous to develop electrochemical treatment processes focused on difficult organic contaminants that do not respond well to soil washing, bioremediation, incineration or conventional or enhanced electro-osmosis or electromigration. The proposed technique is a method for electrochemical deployment of Fenton's Reagent that can be applied in situ or as a lagoon or batch system suitable for the treatment of sediments extracted from marine or river dredgings and sludges from manufacturing plants. The present invention may also be adapted for use as a barrier to moving plumes of contamination threatening aquifers.

In the present invention, reagents that destroy or detoxify otherwise intractable organic compounds such as PCBs and some organochlorine-based pesticides are electrogenerated and electrokinetically delivered. In one embodiment of the present invention, the primary reagent used according to the present invention is Fenton's Reagent, a mixture of ferrous ion and hydrogen peroxide which is mixed in situ.

The present invention demonstrates that this reagent can be delivered electrokinetically through most types of soil including clay and that soils contaminated by mixtures of various contaminant types, e.g., heavy metals and PCBs, can be remediated using the same electrode deployment method.

According to one aspect of the present invention, organic contaminants in soil, clay, sediment or other media are electrochemically remediated using Fenton's Reagent. Components of Fenton's Reagent, peroxide ions and iron ions, are provided to the contaminated medium via electrodes inserted in the soil. A potential difference is applied across the medium to cause the peroxide ions and iron ions to migrate toward each other and the contaminants. The organic contaminants are destroyed, e.g., by oxidation, due to the reaction of the peroxide and iron ions. To avoid adverse changes in pH in the medium and precipitation of insoluble salts on or adjacent to the electrodes, physicochemical conditions of the electrolyte are monitored and adjusted as necessary.

According to some aspect of the present invention, peroxide ion may be generated at an air depolarized cathode.

BRIEF DESCRIPTION OF THE DRAWINGS

The present invention will be better understood by reference to the following drawings in which like reference numerals refer to like elements and in which.

DESCRIPTION OF THE PREFERRED EMBODIMENTS

Figure 1:
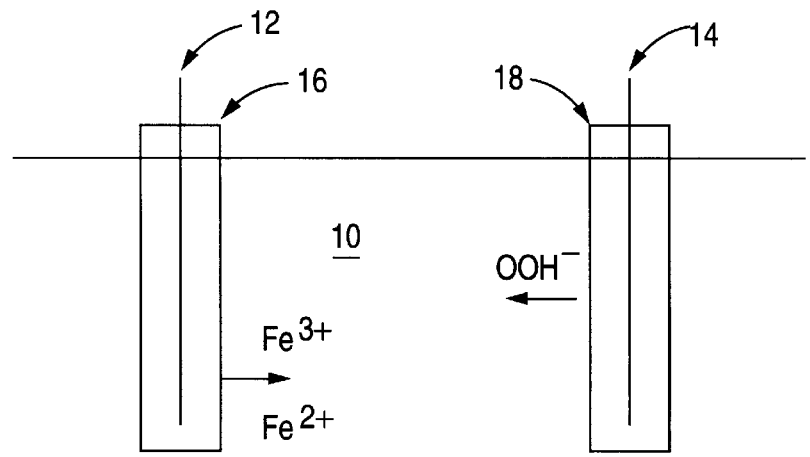
FIG. 1 is a sketch of an exemplary electrode configuration for in situ generation of peroxide and transport of $Fe^{+3}$ from the anode well according to the present invention.

Generally, the present invention relates to methods of decontaminating organically contaminated media, such as soil, clays, and sediments and particularly those media contaminated with multiple types of organic contaminants and apparatuses for carrying out these methods.

According to the present invention, electrodes are arranged in the contaminated medium, peroxide ions and iron ions are supplied to the medium and caused to migrate under the influence of an applied potential. The peroxide ions and the iron ions react in the presence of the organic contaminants, thereby decontaminating the medium.

Organic contaminants can be classified into four types with respect to their amenability for removal by various techniques, as exemplified below. The present invention applies to all four types, although it is especially useful where the organic contaminants are refractive toxic chlororganics, where mineralization would result in complete destruction of the organic contaminant (During mineralization of chlororganics, e.g., chlorobenzene, carbon-chlorine bonds are broken to liberate carbon dioxide and chlorine ion, as in hydrogen chloride.) The four types are: 1) volatile compounds that can be volatilized by vacuum or steam distillation: e.g., diesel, gasoline, cleaning solvents like TCE, chloroform, carbon tetrachloride, some PCBs; 2) water soluble, ionic or partially ionized organic materials such as some pesticides, dyes, detergents, organic acids, bases, soluble heterocyclic compounds, and naturally occurring fulvic and humic acids which migrate under the influence of a direct electrical current along with inorganic ions; 3) insoluble or slightly soluble, nonvolatile organic compounds such as polycyclic hydrocarbons, mineral oils, tars, paint residues, polymers, some pesticides, munitions chemicals such as TNT, SEMTEX; and 4) organic materials that are only slowly degraded by any method. These include fluorocarbon polymers, PVC, polythene, tars from natural sources or produced by oil refinery operations, some PCBs and dioxins.

Fenton's Reagent

Fenton's Reagent is an aqueous mixture of hydrogen peroxide and a ferrous sulfate solution commonly used as a general analytical reagent. For example, it is used to functionalize or modify stable organic chemicals such as chloro- or nitro-substituted species, and polycyclic aromatic compounds.

The mechanism of its reactivity is the generation of free radicals which create chain reactions with organic compounds once initiated.

The chain reaction generally proceeds as follows. Initiation: ferrous ion reacts with hydrogen peroxide liberating a hydroxyl free radical:

$$H_2O_2 + Fe^{+2} \rightarrow \cdot OH + OH^- + Fe^{+3} \quad (1)$$

Reaction of hydroxyl free radical with organic substrates, where R represents a structure such as a polycyclic ring structure like anthracene:

$$\cdot OH + RH \rightarrow H_2O + R \cdot \quad (2)$$

The •OH free radical is a powerful oxidizing agent, second only to fluorine, and therefore, can be used to destroy compounds like PCBs and nitro-aromatics which resist most conventional oxidizing agents. Reaction of organic free radical R• with oxygen:

$$R \cdot + O_2 \rightarrow ROO \cdot \quad (3)$$

A large number of reactions is now possible once the organic substrate has been functionalized by the addition of oxygen, in this case, to the carbon-carbon bonds in the chain or ring structure. In the case of chlorine-substituted compounds, mineralization of chlorine to relatively nontoxic inorganic compounds (e.g., HCl) is immediately apparent following the reaction of water present in the medium and hydroxyl free radical.

Hydrogen peroxide can act as both an oxidizing and reducing agent It is unstable in the presence of some transition metal ions and enzyme systems such as peroxidase found in biological systems. Even on its own, hydrogen peroxide "self destructs" and forms water so that it is nontoxic in the long term. Moreover, hydrogen peroxide, although a powerful reagent, does not harm the environment because most biological species can inactivate it.

Alternative sources of peroxide ion include peroxide solutions based on organic peroxides, peracids such as perboric acid and persulfuric acid. As with hydrogen peroxide, these solutions may be added at the cathode. Substances such as perfluoric acid, while providing peroxide ion would also provide toxic fluoride ion and thus would not be preferred for use in the system of the present invention.

Iron is essential for biological systems and is not considered a toxin. Thus, sources of ferric and ferrous ions may include electrodes composed of iron or solutions of ferric or ferrous salts added at the anode. Alternatively, iron rod or wire bipolar electrodes are placed in the soil where high concentrations of organic pollutants are located. Iron filings may even be added to the contaminated area. The added iron pieces behave as bipolar electrodes and generates ferrous and ferric ions in situ, thereby supplementing the amount of iron ions available to migrate toward the cathode, enhancing the reactivity of the migrating peroxide ions and initiating free radical generation of Fenton's reagent in the medium This approach is particularly useful for media contaminated with tars or oily emulsions of organic and aqueous phases.

Heating, for example, heat generated by Joule effects of the electrical current may be used to enhance the reactivity of Fenton's reagent.

Media treated in accordance with the present invention may be assayed by gas chromatograph to detect the presence of organic pollutants. In some cases, it may be possible to measure the destruction rate continually using a chloride- or nitrate-selective ion detector in the circulating electrolyte. For example, both nitrate and chloride ion concentrations may be measured at the start of operations and controlled in any addition. Temperature, current, voltage, coulombs, reagent quantities and pH are monitored and controlled using a programmable logic unit attached to a PC.

Once treated, the medium would be free of contaminant and reagent residues from the process.

The present invention thus provides an oxidizing system that can be delivered as an aqueous solution, leaves no toxic residue and is powerful enough to deactivate organic toxins that resist aggressive oxidizing agents, bacterial digestion and incineration.

Electrokinetic Delivery Options

Although hydrogen peroxide has a short half life, especially in the presence of transition metal ions found in all soils, by using electrokinetic processes, ions, such as iron cations and peroxide anions utilized in the present invention, can migrate continuously through soil where they can react with organic contaminants Other species can be formed by reaction with Fenton's Reagent and then caused to migrate, thereby benefitting the remediation process of the present invention, including organosulfur compounds, such as mercaptans and sulfides, can be converted to sulfates. Similarly, organic arsenic compounds such as arsenyl compounds react with Fenton's Reagent to form $CO_2$ and arsenates or arsenites which can then be removed by electromigration.

FIG. 1 is a sketch of exemplary deployment of electrodes in situ for carrying out methods according to the present invention.

In an area of contaminated soil 10, one or more anodes 12 and one or more cathodes 14 are located in wells 16, 18.

At the anode(s) 12, iron ions (ferrous and ferric) move in the soil toward the cathode(s) 14 and peroxide ions move in the soil toward the anode(s) 12 by electromigration. (A current source, not shown, is provided by a power supply electrically connected to the electrode array. Suitable voltage differences depend on the size of the area of land being treated in situ, but generally it is desired for the potential to be from about 1.23 V/m and 40 V/m. Preferably, the potential is between about 20 V/m and 40 V/m.) Organic contaminants present in the soil oxidize in the presence and reaction of peroxide, ferric and ferrous ions via the Fenton's Reagent mechanism described above.

Preferred electrodes are composed of $Ti_4O_7$, sold under the trademark EBONEX by CBC Electrodes of Orinda, California). These Magneli phase suboxide electrode materials are capable of long term use, have particularly desirable corrosion resistance and are benign to the environment. These electrodes should be housed in wells as described above.

Continuous electromigration of ionic species through the contaminated medium requires the management of the physicochemical conditions of the electrolytes around the anodes and cathodes in order to avoid adverse pH changes and precipitation of insoluble salts. Generally, an electrolyte management system pumps the electrolyte surrounding the electrode wells to a treatment unit where the electrolyte is "managed" e.g., by the addition of acid or water, and toxic ions are extracted, thereby regenerating the electrolyte so that it may be recirculated to the electrode wells. In the case of chlorinated organics, use of such an electrolyte management system permits removal of chloride ion from the anolyte.

The pH of the electrolyte, and therefore the medium, may be adjusted depending on the characteristics of the species being removed as the remediation process progresses. For example, where anions such as cyanide are present, the electrolyte medium should be maintained sufficiently alkaline to avoid liberation of hydrogen cyanide gas during treatment according to the present invention. Likewise, where species such as phenol are present, a relatively acidic pH is preferred. Adjustment of the pH is achieved by the addition or removal of acid or base as necessary. Adjustment of pH may be accomplished sequentially, for example, first, to allow for removal of certain species under relatively acidic and then, removal of other species under basic conditions, as desired.

Preferred electrolyte management (also known as Electrochemical Ion Exchange) or "EIX" systems include those described in U.S. Pat. Nos. 5,433,829 and 5,589,056, each of which is incorporated herein by reference. Although for convenience, we use EIX technology to manage the electrolyte streams, other methods such as electroplating or precipitation and filtration techniques to remove contaminants from the electrolyte as known in the art can be used. However, EIX, as described in U.S. Pat. Nos. 5,433,829 and 5,589,056, as applied within the parameters discussed herein is important to achieving the results sought by the present invention.

Figure 2:
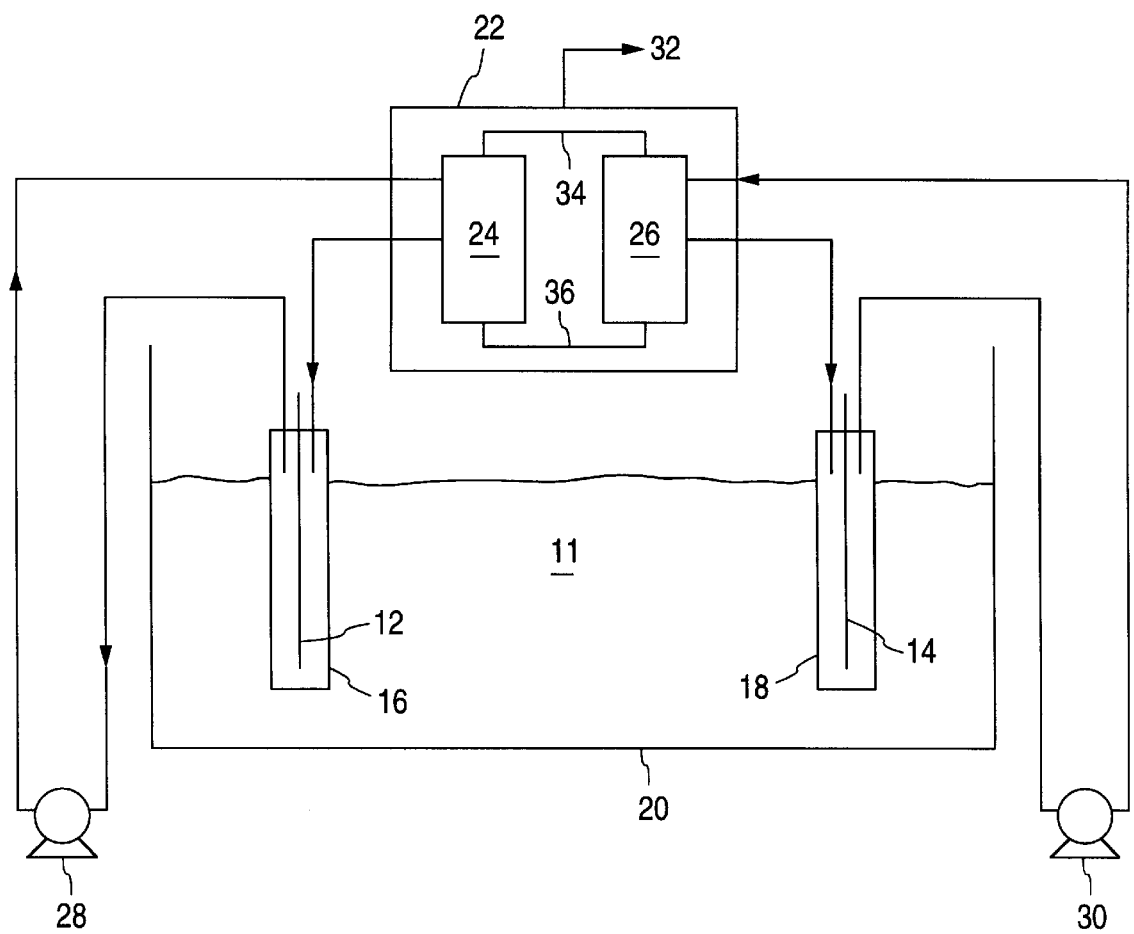
FIG. 2 is a sketch of an air depolarized cathode for use in carrying out an embodiment of the present invention.

FIG. 2 illustrates one embodiment of the present invention in which soil 11 is treated and anodes 12 and cathodes 14 are arranged in a compartment 20 (rather than in situ) and which incorporates such an EIX system 22.

The electrolyte management system 22 typically includes one or more electrochemical ion exchange units 24, 26 and may include one or more pumps 28, 30 to assist with electrolyte flow therein and to the electrodes. Such an electrolyte management system permits regeneration of the electrolyte by separating the ionic contamination therefrom, which contamination may be recovered in a stream 32. The regenerated electrolyte may be recycled back to each of the electrodes for additional stripping. The electrolyte management system also provides a convenient point in the apparatus to adjust pH as desired, if lines 34, 36 connecting units 24 and 26 are provided.

As an example of the operation of such a soil compartment for carrying out the present invention, the apparatus was operated over a period of 2–3 days with the current operating about 8 amps per square meter. The concentrations of iron sulfate in the anode compartment and the hydrogen peroxide in the cathode compartment may be adjusted using the peristaltic pumps. Soil may be sampled at several points in the soil compartment and assayed for the amount of pollutant found Plots of time, temperature, power applied, concentration of reagent, cost and concentration of pollutant will be made.

Use of an electrolyte management system also facilitates addition of hydrogen peroxide (or other peroxide source) to the cathodes or generation of peroxide ion in situ at the cathodes before transporting it through the medium to the polluting compound.

Figure 3:
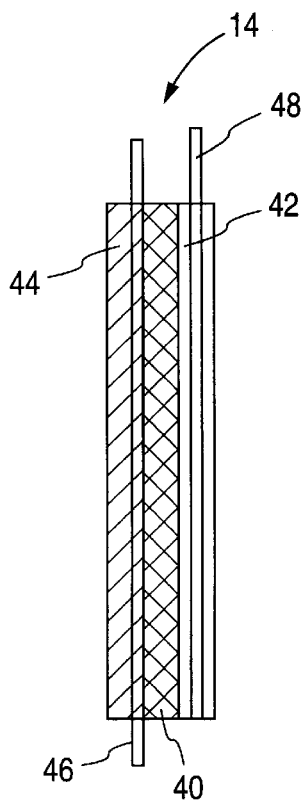
FIG. 3 is a sketch of the arrangement of an exemplary electrokinetic reagent delivery system according to the present invention.

FIG. 3 illustrates such an embodiment using an air feed to a porous carbon/PTFE gas diffusion electrode as the cathode 14

As shown in FIG. 3, composite air depolarized cathode 14 typically comprises a porous matrix 40 (e.g., carbon or a titanium suboxide material such as EBONEX brand) filled with a PTFE powder On one side 42, matrix 40 is filled with air, but on the other side 44, matrix 40 is wetted with moisture available in the soil. Nickel gauze 46 provides electrical contact for feeding electrical current to the cathode. Generally, to generate hydrogen peroxide at such a cathode, the cathode is fed with air through feeder 48. At the interface of the wetted side of the matrix and the air-filled PTFE matrix, oxygen is reduced and hydrogen peroxide is formed according to the following reaction:

$$2H^+ + O_2 + 2e^- = H_2O_2 \tag{4}$$

The peroxide ion from decomposition of the hydrogen peroxide migrates into the soil where it reacts with $Fe^{2+}$,  producing free radicals which attack organic contaminants in the soil as described above.

Figure 4:
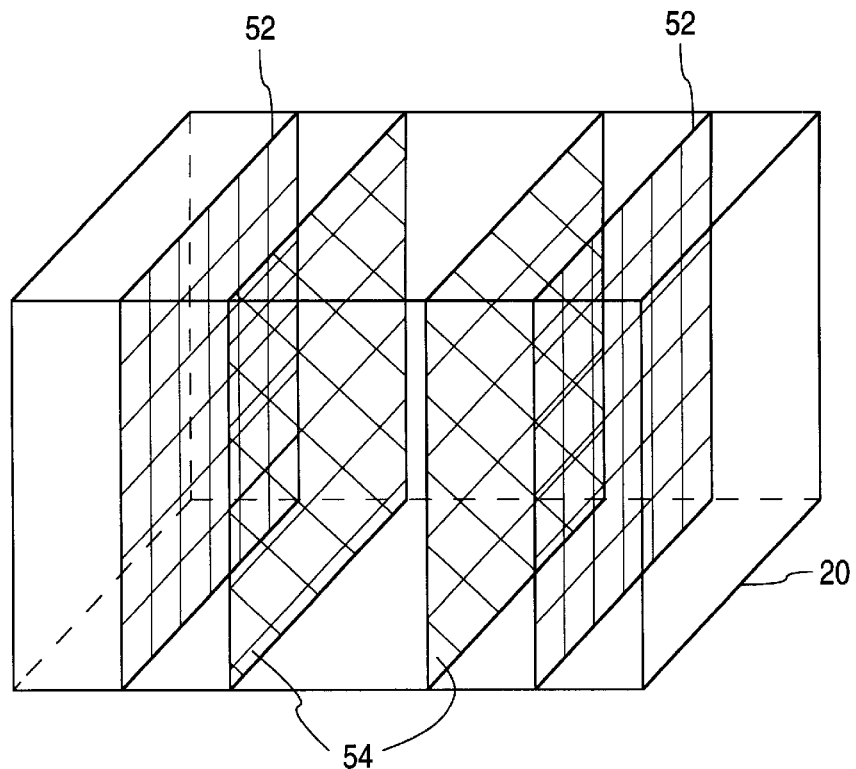
FIG. 4 is a sketch of an exemplary bench apparatus for carrying out methods according to the present invention.

FIG. 4 illustrates an exemplary arrangement 50 of plate electrodes 52 and ion permeable membranes 54 (i.e., membranes that let anions or cations, but not water or neutral species solubilized therein, pass) in a soil compartment 20 for treating contaminated media according to the present invention.

Using the apparatus shown in FIG. 4, a sample of soil spiked with chlorobenzene at 2000 mg per kilogram of soil was placed in the soil compartment 20.

A one percent hydrogen peroxide solution was added to the cathode well (not shown) and molar ferrous sulfate was added to the anode well (not shown). The current was switched on and as the voltage declined from 25 volts to 10.4 volts, the current was adjusted within the range 2–8 amps per square meter. The concentration of chlorobenzene at the end of the process was found to be less than 5 ppm.

It is envisioned that the system of the present invention or an electrochemically cycled redox system can be deployed as a ring fence or active barrier (for example, as described by U.S. Pat. No. 5,433,829) to the movement of polluted groundwater in the same way that electromigration systems are deployed against toxic ions.

For example, when contaminants are moving through groundwater under the influence of a hydraulic gradient in the ground, the contaminated water behaves as a moving "plume." Electrodes in wells may be arranged as a "ring fence" in the path of the plume to form an electrokinetic barrier. Fenton's Reagent can then be added to the medium via the electrode wells or generated in situ as described above. As the plume passes the barrier, ionic contaminants are driven towards the wells for collection. Organic contaminants would react in the presence of the peroxide and ferric/ferrous ions as described above.

The present invention offers the added benefit of having a system already available to strip out excess chloride created by mineralization and recover some iron. Other benefits include: removal of toxic heavy metals, cyanide, arsenates, chromates, selenates and radioactive nuclides using electrode arrays as deployed for present invention; and use of electrokinetic options to cover almost any type of toxic pollutant.

Other redox opportunities for which the present invention may be utilized include: electrogeneration of Caro's acid at the anode and peroxide at the cathode reacting with soil previously dosed with or containing naturally occurring iron; electrogeneration of $Fe^{+3}$ at an anode and migration through the soil, collection of $Fe^{+2}$ at the cathode and recirculation to the anode for regeneration and reinjection; electrogeneration of $Fe^{+3}$ at an anode and migration through the soil, collection of $Fe^{+2}$ at the cathode and recirculation to the anode for regeneration and reinjection and with $Co^{+3}$ or any other acceptable redox ion that will oxidize intractable organic compounds.

We claim:

1. A method of electrochemical remediation, comprising the steps of:

generating peroxide ions at a cathode and iron ions in a medium containing organic contaminants, wherein said medium comprises soil, clay or sediment, or mixtures thereof;

providing a potential difference across said medium via cathodes and anodes inserted in said medium to cause said peroxide ions and said iron ions to migrate toward said contaminants;

oxidizing said contaminants with said peroxide ions and said iron ions, thereby decontaminating said medium between said cathodes and said anodes in a continuous stream;

controlling the pH of the medium as said ions migrate and react to sustain said oxidizing step; and maintaining each of said cathodes at a negative polarity and each of said anodes at a positive polarity throughout said providing and said oxidizing steps.

2. A method according to claim 1, wherein iron is added to said medium to generate said iron ions therein.

3. A method according to claim 1, wherein said step of generating said peroxide ions and iron ions further comprises electrochemically generating said peroxide ions and said iron ions in said contaminated medium.

4. A method, comprising the steps of:

providing anodes and cathodes in wells formed in a medium containing organic contaminants;

circulating an anolyte to deliver iron ions to anode wells in said medium;

circulating a catholyte to deliver peroxide ions to cathode wells in said medium;

providing a potential difference across said medium between cathodes and anodes in their respective wells to cause said peroxide ions and said iron ions to migrate through said medium;

destroying said contaminants in said medium in a continuous stream between said anodes and said cathodes by reacting said peroxide ions, iron ions and organic contaminants;

monitoring and adjusting as necessary the physicochemical conditions of said circulating anolyte and said circulating catholyte; and maintaining each of said cathodes at a negative polarity and each of said anodes at a positive polarity throughout said providing and said oxidizing steps.

5. A method according to claim 4, wherein said peroxide is generated at an air depolarized cathode.

6. A method according to claim 4, wherein the source of peroxide ion is selected from the group consisting of organic peroxides, peracids and hydrogen peroxide.

* * * * *